(12) United States Patent
Nemoto et al.

(10) Patent No.: US 7,773,366 B2
(45) Date of Patent: Aug. 10, 2010

(54) SOLID ELECTROLYTIC CAPACITOR AND METHOD OF FABRICATING THE SAME

(75) Inventors: Masaaki Nemoto, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 227 days.

(21) Appl. No.: 12/037,391

(22) Filed: Feb. 26, 2008

(65) Prior Publication Data

US 2009/0128995 A1    May 21, 2009

(30) Foreign Application Priority Data

Feb. 28, 2007   (JP) .............................. 2007-048783

(51) Int. Cl.
    *H01G 9/00* (2006.01)
(52) U.S. Cl. ...................................... 361/523; 29/25.03
(58) Field of Classification Search ......... 361/523–529, 361/535, 539; 29/25.03
    See application file for complete search history.

(56) References Cited

U.S. PATENT DOCUMENTS

2008/0232003 A1 *   9/2008   Ibusuki et al. .......... 360/324.11

FOREIGN PATENT DOCUMENTS

| JP | 53040864 | A  * | 4/1978 |
| JP | 05226191 | A1 | 9/1993 |
| JP | 200414667 | A1 | 1/2004 |
| JP | 2006261660 | A1 | 9/2006 |

* cited by examiner

*Primary Examiner*—Eric Thomas
(74) *Attorney, Agent, or Firm*—Marvin A. Motsenbocker; Mots Law, PLLC

(57) ABSTRACT

A solid electrolytic capacitor comprising an anode body, a dielectric layer placed on the surface of the anode body, a conductive polymer layer placed on the surface of the dielectric layer, and a housing accommodating at least the anode body, the dielectric layer and the conductive polymer layer, wherein a water-retaining layer having higher water absorption than that of the housing is placed between the conductive polymer layer and the housing.

15 Claims, 2 Drawing Sheets

SOLID ELECTROLYTIC CAPACITOR AND METHOD OF FABRICATING THE SAME

BACKGROUND OF THE INVENTION

1. Field of the Invention

The present invention relates to a solid electrolytic capacitor whose reliability is improved.

2. Description of the Related Art

A solid electrolytic capacitor has an excellent high-frequency characteristic, and in addition to this it is compact and has a large capacity, and therefore it is widely used in high-frequency circuits of various electronic equipment such as personal computers and image equipment.

A cross section structure of a conventional solid electrolytic capacitor is shown in FIG. 3. FIG. 3(a) is a longitudinal sectional view, FIG. 3(b) is a horizontal sectional view, and FIG. 3(c) is a transverse sectional view. An anode body, a dielectric layer and a conductive polymer layer are formed around an anode lead 2. An enlarged sectional view of the anode body and its circumference is shown in FIG. 4. An anode body 3a is formed around the anode lead 2 by sintering particles of valve metal such as tantalum, niobium, titanium or aluminum into a rectangular solid.

A dielectric layer 3b is formed on the surfaces of this anode body 3a and the anode lead 2. The dielectric layer 3b is formed by oxidizing the surfaces of the anode body 3a and the anode lead 2 by, for example, in an anodizing method. A conductive polymer layer 3c is formed to fill above this dielectric layer 3b and a space.

A carbon layer 4 and a silver layer 5 are formed on the surface of the conductive polymer layer 3c. A plate-like anode terminal 1 is connected to the anode lead 2, and a plate-like cathode terminal 6 is connected to the silver layer 5.

A housing 8 is formed into a rectangular shape so as to accommodate the anode lead 2, the anode body 3a, the dielectric layer 3b, the conductive polymer layer 3c, the carbon layer 4 and the silver layer 5. The housing 8 is, for example, composed of an epoxy resin. The anode terminal 1 and the cathode terminal 6 are drawn out of the housing 8 in opposite directions, and are respectively bent downward. Tip portions of these terminals are located along the under surface of the housing 8, and used for electrically connecting the solid electrolytic capacitor to a mounted board as described (for example, see Japanese Unexamined Patent Publication No. 2004-14667).

SUMMARY OF THE INVENTION

In the above-mentioned conventional constitution, a solid electrolytic capacitor has a problem that electrical characteristics are deteriorated due to a high-temperature treatment such as aging.

The present invention was made solve the above conventional problems, and it is an object of the present invention to provide a solid electrolytic capacitor in which the deterioration of characteristics due to a high-temperature treatment is little and a method of fabricating the solid electrolytic capacitor.

In order to solve the above-mentioned problems, the solid electrolytic capacitor of the present invention has a unit of suppressing the peeling of a conductive polymer layer from a dielectric layer due to degradation by reducing the dissipation of water from the conductive polymer layer due to a high-temperature treatment.

The solid electrolytic capacitor of the present invention is a solid electrolytic capacitor containing an anode body, a dielectric layer placed on the surface of the above-mentioned anode body, a conductive polymer layer placed on the surface of the above-mentioned dielectric layer, and a housing accommodating at least the above-mentioned anode body, the above-mentioned dielectric layer and the above-mentioned conductive polymer layer, wherein a water-retaining layer having higher water absorption than that of the above-mentioned housing is placed between the above-mentioned conductive polymer layer and the above-mentioned housing.

Thereby, it is possible to supply water that the water-retaining layer retains to the conductive polymer layer within the housing, and is possible to reduce the dissipation of water from the conductive polymer layer even in a high-temperature treatment. Consequently, the degradation of the conductive polymer such as shrinkage in volume does not occur, and therefore the peeling from the dielectric layer is suppressed in the solid electrolytic capacitor of the present invention. When the conductive polymer layer is peeled from the dielectric layer, this peeled portion does not function as a capacitor, and therefore, this results in the deterioration of characteristics such as reduction in electrostatic capacity or increase in leakage current or ESR (equivalent series resistance).

The water absorption of the housing is preferably 0.04% or less. Thereby, water dissipated to the outside through the housing can be suppressed, and the reduction in the content of internal water can be prevented.

Furthermore, preferably, at least a part of the water-retaining layer is in contact with the conductive polymer layer. Thereby, it is possible to supply water to the conductive polymer layer more effectively.

As the water-retaining layer, an epoxy resin can be used, and the water-retaining layer can be formed by applying a liquid epoxy resin.

A method of fabricating a solid electrolytic capacitor of the present invention is characterized by including the steps of: forming the dielectric layer on the surface of the anode body; forming the conductive polymer layer on the surface of the above-mentioned dielectric layer; applying a material for a water-retaining layer in such a way that at least a part of the above-mentioned water-retaining layer is in contact with the above-mentioned conductive polymer layer, and then curing the material to form a water-retaining layer; allowing the above-mentioned water-retaining layer to absorb water; and forming the housing so as to accommodate at least the above-mentioned anode body, the above-mentioned dielectric layer, the above-mentioned conductive polymer layer and the above-mentioned water-retaining layer.

Thereby, the water-retaining layer can be formed between the conductive polymer layer and the housing, and simultaneously, the water-retaining layer can adequately absorb water.

In accordance with the present invention, it is possible to suppress the deterioration of electrical characteristics of the capacitor resulting from the degradation of the conductive polymer layer, and it is possible to provide a solid electrolytic capacitor having excellent reliability and a method of fabricating this solid electrolytic capacitor.

BRIEF DESCRIPTION OF THE DRAWINGS

FIG. 1(a) is a longitudinal sectional view, FIG. 1(b) is a horizontal sectional view, and FIG. 1 (c) is a transverse sectional view;

FIG. 2(a) is a longitudinal sectional view, FIG. 2(b) is a horizontal sectional view, and FIG. 2(c) is a transverse sectional view;

FIG. 3(a) is a longitudinal sectional view, FIG. 3(b) is a horizontal sectional view, and FIG. 3(c) is a transverse sectional view;

DETAILED DESCRIPTION OF THE PREFERRED EMBODIMENT

Hereinafter, the embodiments of the present invention will be described in reference to drawings. Further, the present invention is not limited to these embodiments.

First Embodiment

Figure 1:
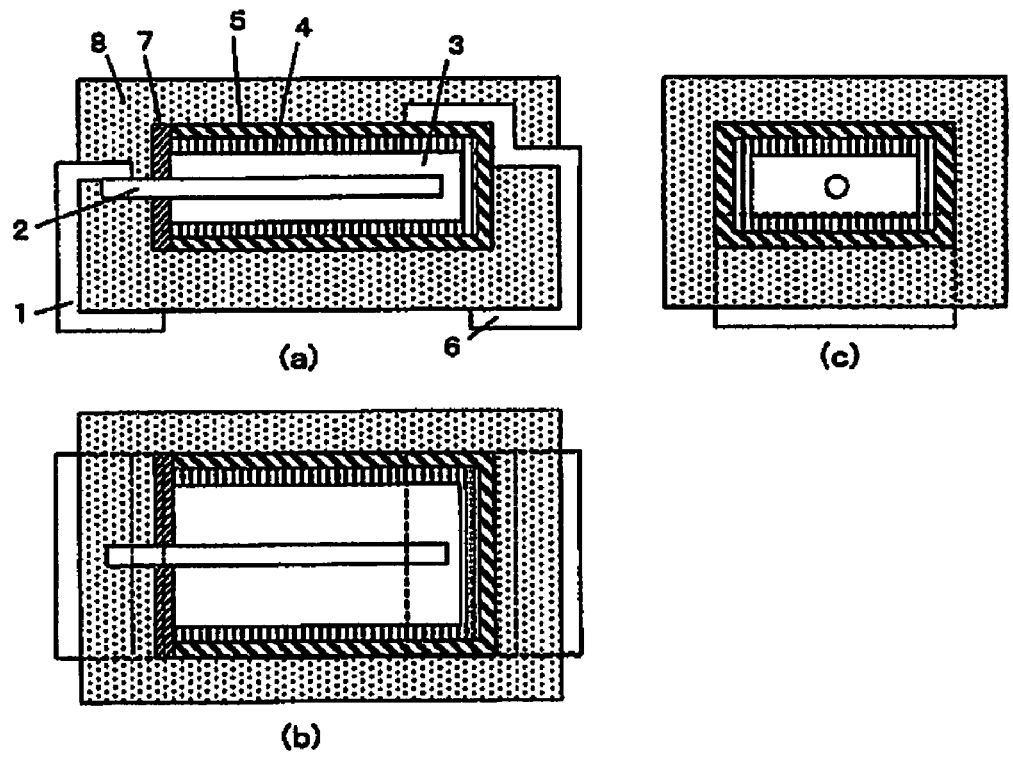
FIG. 1 is a view of a cross section structure of a solid electrolytic capacitor in a first embodiment of the present invention.
Figure 4:
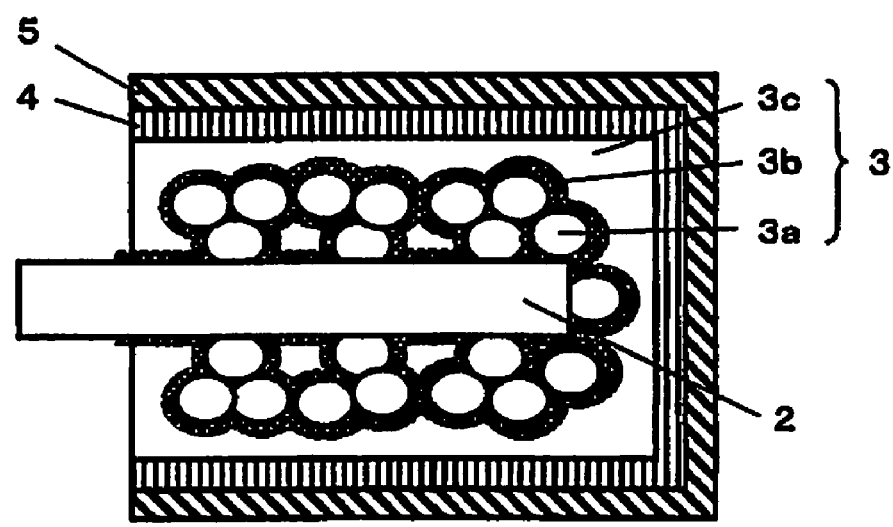
FIG. 4 is an enlarged sectional view of the anode body and its circumference.

FIG. 1 is a view of a cross section structure of a solid electrolytic capacitor in a first embodiment of the present invention, FIG. 1(a) is a longitudinal sectional view, FIG. 1(b) is a horizontal sectional view, and FIG. 1 (c) is a transverse sectional view. FIG. 4 is an enlarged sectional view of the anode body and its circumference. Referring to FIG. 1 and FIG. 4, hereinafter, a structure of the solid electrolytic capacitor according to the first embodiment of the present invention will be described.

First, in the solid electrolytic capacitor of the present invention, as shown in FIG. 1, the anode lead 2 is composed of the metal having a valve action and is buried in a rectangular solid 3 composed of an anode body, a dielectric layer and a conductive polymer.

An internal structure of this rectangular solid 3 will be described by use of FIG. 4. An anode body 3a in rectangular solid form obtained by sintering and forming metal particles made of the metal having a valve action in a vacuum is formed around the anode lead 2.

Here, valve metal, which composes the anode lead 2 and the anode body 3a, is a metal material capable of forming an insulating oxide film, and as such metal, titanium, tantalum, aluminum, niobium, hafnium, zirconium, zinc, tungsten, bismuth, and antimony can be used. As the anode body 3a, by sintering particles of these metals, a porous sintered substance can be obtained. Among others, titanium, tantalum, aluminum and niobium, whose oxides have a high dielectric constant and the availability of raw materials is easy, are preferable as a material. Particularly, niobium whose oxide has a dielectric constant of about 1.5 times that of tantalum is preferable.

As metal having a valve action, which composes the anode lead 2 and the anode body 3a, an alloy between the above-mentioned metals having a valve action can also be used. As the alloy, an alloy of the valve metal and other metals can also be used, but in this case, it is preferable that a proportion of the metal having a valve action is 50% or more.

In addition, the above-mentioned anode body 3a is used as a porous substance of the valve metal, and in place of this, the present invention can be embodied by use of porous substances such as porous metal materials or ternary network metal materials which does not depend on a sintering process.

Next, the dielectric layer 3b made of oxide of the metal having a valve action is formed on the surfaces of the anode lead 2 and the anode body 3a. For example when the valve metal is composed of niobium metal, the dielectric layer 3b becomes niobium oxide.

The dielectric layer 3b is formed by anodizing the anode lead 2 and the anode body 3a in an aqueous solution of a phosphoric acid, etc. Thereby, the dielectric layer 3b is formed on the surface of the valve metal within many pores of the anode body 3a. A film thickness of the dielectric layer 3b is preferably in a range of 10 to 500 nm. When the film thickness of the dielectric layer 3b is larger than 500 nm, an electrostatic capacity is reduced and there is a fear of causing disadvantages that peeling off from the anode lead 2 and the anode body 3a is apt to occur. On the contrary, when the film thickness of the dielectric layer 3b is less than 10 nm, there is a fear that a withstand voltage is decreased and the leakage current is increased.

The conductive polymer layer 3c made of polypyrrole, etc is formed on the dielectric layer 3b, and the inside of many pores of the anode body 3a is filled with the conductive polymer. Materials of the conductive polymer layer 3c is not particularly limited as long as it is a polymer material having conductivity, and materials, such as polypyrrole, polyaniline, and polythiophene, which are highly conductive, can be employed.

The conductive polymer layer 3c can be formed by a chemical polymerization method or the like.

By applying carbon paste onto the conductive polymer layer 3c and drying it, a carbon layer 4 made of a layer including carbon particles is formed, and by applying silver paste onto the carbon layer 4 and drying it, a silver layer 5 made of a layer including silver particles is formed. As shown in FIG. 1, the carbon layer 4 and the silver layer 5 are not formed on the surface of a projected portion of the anode lead 2 in the rectangular solid 3 composed of the anode body 3a, the dielectric layer 3b and the conductive polymer 3c.

Next, a liquid epoxy resin is applied onto the surface (the surface on which the carbon layer 4 and the silver layer 5 are not formed) of a projected portion of the anode lead 2 with a dispenser and then cured to form a water-retaining layer 7. Examples of the liquid epoxy resin which can be used for the water-retaining layer 7 include XM-5866, ME-5909, ZC-203, ZC-203T, and YC-107B, produced by PELNOX Ltd. The water absorption of the cured liquid epoxy resins is shown in Table 1. The resin was cured at 120° C. for 60 minutes.

TABLE 1

| Model | Water Absorption (wt %) |
|---|---|
| XM-5866 | 0.214 |
| ME-5909 | 0.139 |
| YC-107B | 0.067 |
| ZC-203T | 0.040 |
| ZC-203 | 0.031 |

(Curing Conditions: Heating at 120° C. for 60 min.)

In the measurement of the water absorption, after making a sample absorb water by holding an epoxy resin to become a sample in a saturated water vapor, a amount of the absorbed water is measured by a Karl Fischer's coulometric titration method, and the water absorption is determined in terms of a ratio of the absorbed water amount to a sample weight. In a measuring method of water content based on a Karl Fischer's method, a water content in a substance is quantified through the use of the fact that an electrolyte (Karl Fischer's reagent) containing iodide ion, sulfur dioxide and alcohol as the main ingredient reacts specifically with water in the presence of methanol. This method is classified into a coulometric titration method and a volumetric titration method depending on a manner of titration. The coulometric titration method is a method in which an iodine amount consumed by a reaction with water is electrically detected and this amount is converted to a water amount.

In measurement of the water content of the sample by the Karl Fischer's coulometric titration method, a trace water measuring apparatus (moisture meter) (CA-200 manufactured by Mitsubishi Chemical Corporation) is used, and a sample adequately absorbed water by being held for 150 hours in a saturated water vapor of 25° C. is heated to 150° C. while flowing dry argon gas to vaporize water in the sample into argon gas. This argon gas containing vaporized water is reacted with the Karl Fischer's reagent to determine an apparent amount of vaporized water. By subtracting a background value from this apparent amount, water amount (weight) vaporized from in the sample into an inert gas cane determined. This measurement of water amount is continued until vaporization of water from the sample ends (until a measurement reaches the background value) to determine the total weight of water contained in the sample. The water absorption is determined in terms of a weight ratio of this total weight of water to a sample weight. Weight of the samples was 0.2 to 0.3 grams.

The water absorption of the water-retaining layer 7 and the containing 8 was determined according to this measuring method.

Moisturing was performed by retaining the sample for a long time in high-temperature and high-humidity conditions so that the water-retaining layer absorbs water before forming the housing 8.

A cathode terminal 6 in flat plate form is connected to the surface of the silver layer 5 through a conductive adhesive, and an anode terminal 1 in flat plate form is connected to the anode lead 2 by spot welding. By expanding the widths of the anode terminal 1 and the cathode terminal 6 to about the same width as that of the rectangular solid 3 composed of the anode body 3a, the dielectric layer 3b and the conductive polymer 3c, resistance loss at a terminal portion can be reduced. Then, the housing 8 made of an epoxy resin or the like is formed by injection molding with the anode terminal 1 and a part of the cathode terminal 6 drawn out as shown in FIG. 1. Here, as the epoxy resin used in the housing 8, an epoxy resin whose water absorption is lower than that of the water-retaining layer 7 is preferably employed. As materials of the anode terminal 1 and the cathode terminal 6, conductive materials such as nickel or the like can be used, and ends of the anode terminal 1 and the cathode terminal 6, drawn out of the housing 8 and exposed, are respectively bent to function as a terminal of the solid electrolytic capacitor.

Ultimately, aging is performed.

Second Embodiment

Figure 2:
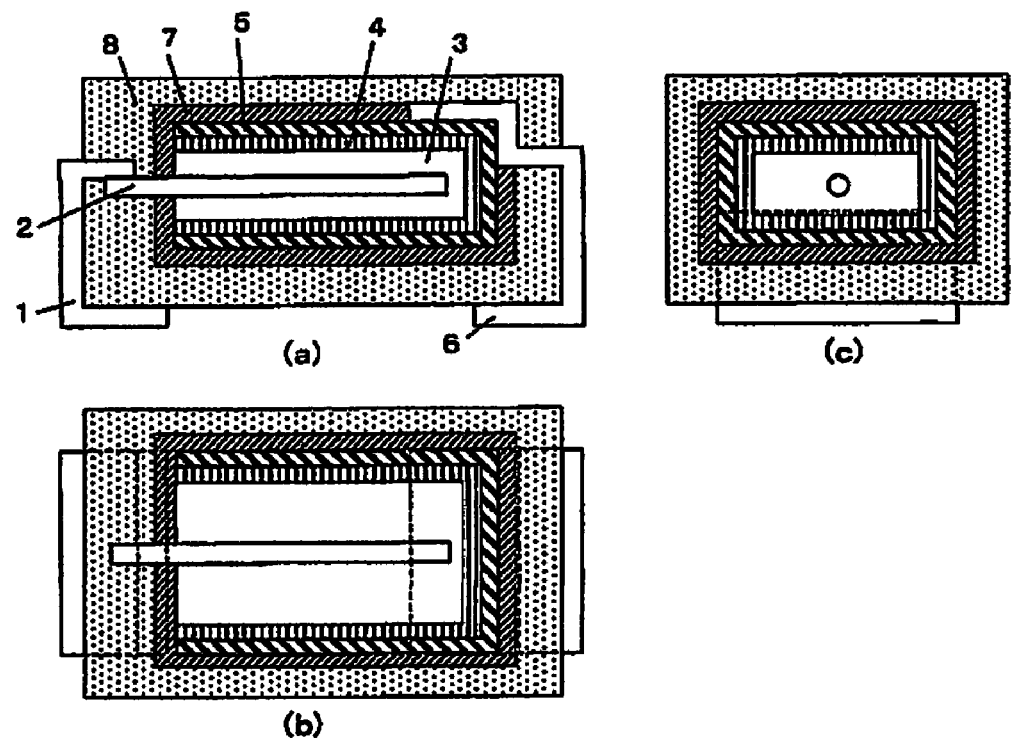
FIG. 2 is a view of a cross section structure of a solid electrolytic capacitor according to a second embodiment of the present invention.

FIG. 2 is a view of a cross section structure of a solid electrolytic capacitor according to a second embodiment of the present invention. FIG. 2(a) is a longitudinal sectional view, FIG. 2(b) is a horizontal sectional view, and FIG. 2(c) is a transverse sectional view. As shown in FIG. 2, this capacitor has the same constitution as in First Embodiment except that the water-retaining layer 7 is formed not only on the surface (the surface on which the carbon layer 4 and the silver layer 5 are not formed) of a projected portion of the anode lead 2 in the rectangular solid 3 composed of the anode body 3a, the dielectric layer 3b and the conductive polymer 3c, but also on the surface on which the carbon layer 4 and the silver layer 5 are formed.

Since the water-retaining layer 7 is formed even on the surface on which the carbon layer 4 and the silver layer 5 are formed, a moisture-retentive effect is high and an water amount to be absorbed can retain is increased, and therefore, the dissipation of water from the conductive polymer layer 3c due to a high-temperature treatment can be further prevented. In addition, the water-retaining layer 7 in Second Embodiment of the present invention does not have to cover all surfaces of the rectangular solid 3 composed of the anode body 3a, the dielectric layer 3b and the conductive polymer 3c, and the water-retaining layer 7 is not formed at the connecting surface with the cathode terminal 6 and the silver layer 5.

EXAMPLE 1

A sectional view of a solid electrolytic capacitor in Example 1 is shown in FIG. 1, and an enlarged sectional view of the anode body and its circumference is shown in FIG. 4. Hereinafter, a method of fabricating the solid electrolytic capacitor in Example 1 is shown below. First, a wire made of niobium was cut to the prescribed length to form an anode lead 2. An anode body 3a obtained by sintering niobium particles (particle diameter: 0.1 to 10 μm) is formed around the anode lead 2. Thereafter, anodizing was applied to the surfaces of the anode body 3a and the anode lead 2 to form the dielectric layer 3b on the surfaces of the anode body 3a and the anode lead 2. In anodizing, the anode body 3a and the anode lead 2 were immersed in an aqueous solution of a phosphoric acid and a voltage was applied to the anode body 3a and the anode lead 2.

Thus, the dielectric layer 3b was formed on the surfaces of the anode body 3a and the anode lead 2. Next, a conductive polymer layer 3c made of polypyrrole was formed on the dielectric layer 3b by chemical polymerization or the like.

Next, laser beams were irradiated to a fin portion to remove the fin.

Thereafter, the steps of forming a carbon layer 4 and a silver layer 5 on the conductive polymer layer 3c, and adjusting a length of the anode lead 2 were performed. However, the carbon layer 4 and the silver layer 5 are not formed on the surface of a projected portion of the anode lead 2. Then, a cathode terminal in flat plate form is connected to the surface of this silver layer 5 by use of a conductive adhesive (silver paste). An anode terminal in flat plate form is connected to the anode lead 2 by spot welding.

Thereafter, a water-retaining layer 7 was formed. A liquid epoxy resin is applied onto the surface of a projected portion of the anode lead 2 with a dispenser. Next, the epoxy resin was cured by heating at 120° C. for 60 minutes. As the liquid epoxy resin, XM-5866 (water absorption after curing 0.214%) made by PELNOX Ltd. was used. Then, the step of absorbing water was performed. The step of absorbing water was performed by holding the water-retaining layer for 120 hours under high-temperature and high humidity conditions of 60° C., 90% RH (relative humidity).

Thereafter, the resultant was put in a die, and a synthetic resin having a thermosetting property such as an epoxy resin was injection molded to form a housing 8. The epoxy resin for the housing 8 is made of a biphenyl type epoxy resin and a flame retarder (brominated epoxy resin/antimony trioxide), a imidazole curing agent, 1% by volume of a plasticizer (silicone) and 82% by volume of a filler (molten silica).

In order to suppress the water content of the water-retaining layer 7 from being dissipated through the comings and goings of water via the housing 8, it is necessary to make the water absorption of a resin of the housing 8 smaller than the water absorption of the water-retaining layer 7. The water absorption of the resin of the housing 8 in this Example was 0.028%. The water absorption of the resin of the housing 8 was measured by the above-mentioned Karl Fischer's coulometric titration method. In addition, the water absorption of epoxy resin for the housing 8 can be changed by changing the content ratio of the filler (molten silica).

Further, the step of bending the anode terminal and the cathode terminal and the step of aging were performed to complete a solid electrolytic capacitor.

EXAMPLE 2

A sectional view of a solid electrolytic capacitor in Example 2 is shown in FIG. 2. The capacitor of in Example 2 has the same constitution as in Example 1 except that the water-retaining layer 7 covers not only the surface of a projected portion, but also all surfaces of a cathode draw out layer other than the cathode terminal. Further, the water-retaining layer 7 needs to be covered with the housing 8.

EXAMPLE 3

A solid electrolytic capacitor of Example 3 has the same constitution as that of Example 1 except for a forming method of the housing 8. A method of forming the housing 8 in Example 3 is not injection molding. The housing 8 was formed by immersing in a liquid epoxy resin and curing the liquid epoxy resin at 100° C. for 60 minutes. As the liquid epoxy resin, ZC-203T (water absorption 0.040%), YC-107B (water absorption 0.067%), and ME-5909 (water absorption 0.139%) were used.

COMPARATIVE EXAMPLE 1

Figure 3:
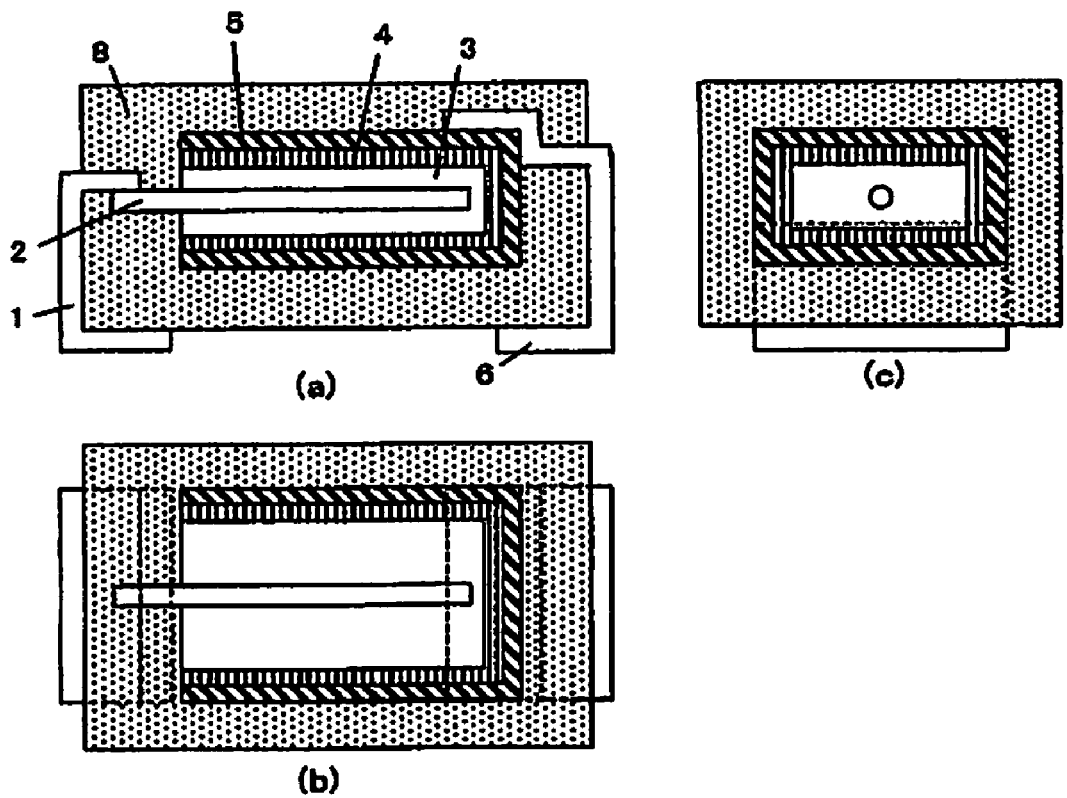
FIG. 3 is a view of a cross section structure of a solid electrolytic capacitor in a conventional example.

FIG. 3 is a sectional view of a solid electrolytic capacitor in Comparative Example. The solid electrolytic capacitor in Comparative Example has the same constitution as that of Example 1 except for not forming the water-retaining layer.

(Evaluations)

The solid electrolytic capacitors fabricated by the methods in the above-mentioned Example 1 and Example 2, and the solid electrolytic capacitor of Comparative Example were heated at 260° C. for 10 seconds as a reflow treatment, and then a high-temperature load test, in which a temperature was 105° C. and a voltage of 2.5 V was applied, was performed.

A capacity, an ESR and a leakage current at initial, after reflow treatment, after 1000 hours in the high-temperature load test and after 2000 hours in the high-temperature load test were investigated. The capacity was measured at 120 Hz with a LCR meter. The ESR was measured at 100 kHz with a LCR meter. The leakage current was measured with a direct current source and a current monitor. The number of samples was 100 for each of Example 1, Example 2, and Comparative Example.

Rates of change of a capacity, an ESR and a leakage current of Examples 1 and 2, and Comparative Example are shown in Tables 2 to 4. In Examples 1 and 2, the capacity, the ESR and the leakage current after reflow change little from those at initial, but on the other hand, in Comparative Example, the capacity is reduced and the ESR and the leakage current increase after reflow. As for the high-temperature load test, in Examples 1 and 2, the capacity and the leakage current are slightly reduced and the ESR increases slightly after 1000 hours and 2000 hours, respectively, but in Comparative Example, the capacity is significantly reduced and the ESR and the leakage current significantly increase. As described above, in Examples 1 and 2, by providing the water-retaining layer whose water absorption is higher than that of the housing, the deterioration of characteristics after reflow or in the high-temperature load test is suppressed compared with Comparative Example.

TABLE 2

| | Rate of Change of Capacity (%) | | | |
|---|---|---|---|---|
| | Initial | After Reflow | High-Temperature Load Test, After 1000 hrs. | High-Temperature Load Test, After 2000 hrs. |
| Example 1 | 0.0 | −0.2 | −0.8 | −1.7 |
| Example 2 | 0.0 | −0.3 | −0.9 | −1.9 |
| Comparative Example | 0.0 | −47.3 | −69.2 | −82.1 |

TABLE 3

| | Rate of Change of ESR (%) | | | |
|---|---|---|---|---|
| | Initial | After Reflow | High-Temperature Load Test, After 1000 hrs. | High-Temperature Load Test, After 2000 hrs. |
| Example 1 | 0.0 | +8.3 | +10.1 | +13.6 |
| Example 2 | 0.0 | +8.1 | +9.8 | +12.7 |
| Comparative Example | 0.0 | +255.3 | +797.2 | +2411.0 |

TABLE 4

| | Rate of Change of Leakage Current (%) | | | |
|---|---|---|---|---|
| | Initial | After Reflow | High-Temperature Load Test, After 1000 hrs. | High-Temperature Load Test, After 2000 hrs. |
| Example 1 | 0.0 | +0.2 | −4.3 | −11.2 |
| Example 2 | 0.0 | +0.5 | −4.1 | −10.4 |
| Comparative Example | 0.0 | +392.6 | +377.6 | +352.8 |

Rates of change of a capacity, an ESR and a leakage current of Examples 1 and 3 are shown in Tables 5 to 7. When the water absorption of the housing 8 is 0.04% or less, the capacity, the ESR and the leakage current after reflow change little from those at initial, but on the other hand, when the water absorption of the housing 8 is higher than 0.04%, the capacity is reduced and the ESR and the leakage current increase after reflow. As for the high-temperature load test, when the water absorption of the housing 8 is 0.04% or less, the capacity and the leakage current are slightly reduced and the ESR increases slightly after 1000 hours and 2000 hours, respectively, but when the water absorption is higher than 0.04%, the capacity is significantly reduced, the ESR significantly increases, and the leakage current increases or the reduction of leakage current significantly becomes small. As described above, by setting the water absorption of the housing 8 at 0.04% or less, the deterioration of characteristics after reflow or in the high-temperature load test is suppressed compared with the case where the water absorption is higher than 0.04%. Thus, it is necessary to make the water absorption of the resin of the housing small, and the water absorption is preferably 0.04% or less.

TABLE 5

| | Water Absorption of Housing (wt %) | Water Absorption of Water-Retaining Layer (wt %) | Rate of Change of Capacity (%) | | | |
| --- | --- | --- | --- | --- | --- | --- |
| | | | Initial | After Reflow | High-Temperature Load Test, After 1000 hrs. | High-Temperature Load Test, After 2000 hrs. |
| Example 1 | 0.028 | 0.214 | 0.0 | −0.2 | −0.8 | −1.7 |
| Example 3 | 0.040 | | 0.0 | −1.3 | −1.9 | −3.9 |
| | 0.067 | | 0.0 | −8.9 | −10.3 | −14.1 |
| | 0.139 | | 0.0 | −14.8 | −15.5 | −19.8 |

TABLE 6

| | Water Absorption of Housing (wt %) | Water Absorption of Water-Retaining Layer (wt %) | Rate of Change of ESR (%) | | | |
| --- | --- | --- | --- | --- | --- | --- |
| | | | Initial | After Reflow | High-Temperature Load Test, After 1000 hrs. | High-Temperature Load Test, After 2000 hrs. |
| Example 1 | 0.028 | 0.214 | 0.0 | +8.3 | +10.1 | +13.6 |
| Example 3 | 0.040 | | 0.0 | +11.9 | +14.4 | +18.5 |
| | 0.067 | | 0.0 | +23.3 | +30.2 | +51.1 |
| | 0.139 | | 0.0 | +43.8 | +64.0 | +97.2 |

TABLE 7

| | Water Absorption of Housing (wt %) | Water Absorption of Water-Retaining Layer (wt %) | Rate of Change of Leakage Current (%) | | | |
| --- | --- | --- | --- | --- | --- | --- |
| | | | Initial | After Reflow | High-Temperature Load Test, After 1000 hrs. | High-Temperature Load Test, After 2000 hrs. |
| Example 1 | 0.028 | 0.214 | 0.0 | +0.2 | −4.3 | −11.2 |
| Example 3 | 0.040 | | 0.0 | +0.9 | −3.2 | −9.9 |
| | 0.067 | | 0.0 | +22.3 | +11.8 | −1.4 |
| | 0.139 | | 0.0 | +39.1 | +26.5 | +10.7 |

As described above, in the solid electrolytic capacitor of the present invention, since it becomes possible to provide a solid electrolytic capacitor whose reliability is improved, it can be applied to applications such as high-frequency circuits of various electronic equipment such as personal computers and image equipment.

What is claimed is:

1. A solid electrolytic capacitor comprising:
   an anode body,
   a dielectric layer placed on a surface of said anode body,
   a conductive polymer layer placed on a surface of said dielectric layer, and
   a housing accommodating at least said anode body, said dielectric layer and said conductive polymer layer,
   wherein a water-retaining layer having higher water absorption than that of said housing is placed between an outer surface of said conductive polymer layer and an inner surface of said housing.

2. The solid electrolytic capacitor according to claim 1, wherein the water absorption of said housing is 0.04% or less.

3. The solid electrolytic capacitor according to claim 2, wherein at least a part of said water-retaining layer is in contact with said conductive polymer layer.

4. The solid electrolytic capacitor according to claim 2, wherein an epoxy resin is used as said water-retaining layer.

5. The solid electrolytic capacitor according to claim 2, wherein a porous body of a valve metal is used as said anode body.

6. The solid electrolytic capacitor according to claim 1, wherein at least a part of said water-retaining layer is in contact with said conductive polymer layer.

7. The solid electrolytic capacitor according to claim 6, wherein an epoxy resin is used as said water-retaining layer.

8. The solid electrolytic capacitor according to claim 6, wherein a porous body of a valve metal is used as said anode body.

9. The solid electrolytic capacitor according to claim 1, wherein an epoxy resin is used as said water-retaining layer.

10. The solid electrolytic capacitor according to claim 9, wherein a porous body of a valve metal is used as said anode body.

11. The solid electrolytic capacitor according to claim 1, wherein a porous body of valve metal is used as said anode body.

12. A method of fabricating a solid electrolytic capacitor, comprising the steps of:
   forming a dielectric layer on the surface of an anode body;
   forming a conductive polymer layer on a surface of said dielectric layer;
   applying a material for a water-retaining layer in such a way that at least a part of said water-retaining layer is in contact with said conductive polymer layer, and then curing the material to form said water-retaining layer;
allowing said water-retaining layer to absorb water; and
forming a housing so as to accommodate at least said anode body, said dielectric layer, said conductive polymer layer and said water-retaining layer.

13. The method of fabricating a solid electrolytic capacitor according to claim 12, wherein the water absorption of said housing is 0.04% or less.

14. The method of fabricating a solid electrolytic capacitor according to claim 12, wherein an epoxy resin is used as said water-retaining layer.

15. The method of fabricating a solid electrolytic capacitor according to claim 12, wherein a porous body of valve metal is used as said anode body.

* * * * *